April 7, 1953  A. J. SIMPSON ET AL  2,633,990
FILTERING DEVICE
Filed Oct. 3, 1949  2 SHEETS—SHEET 1
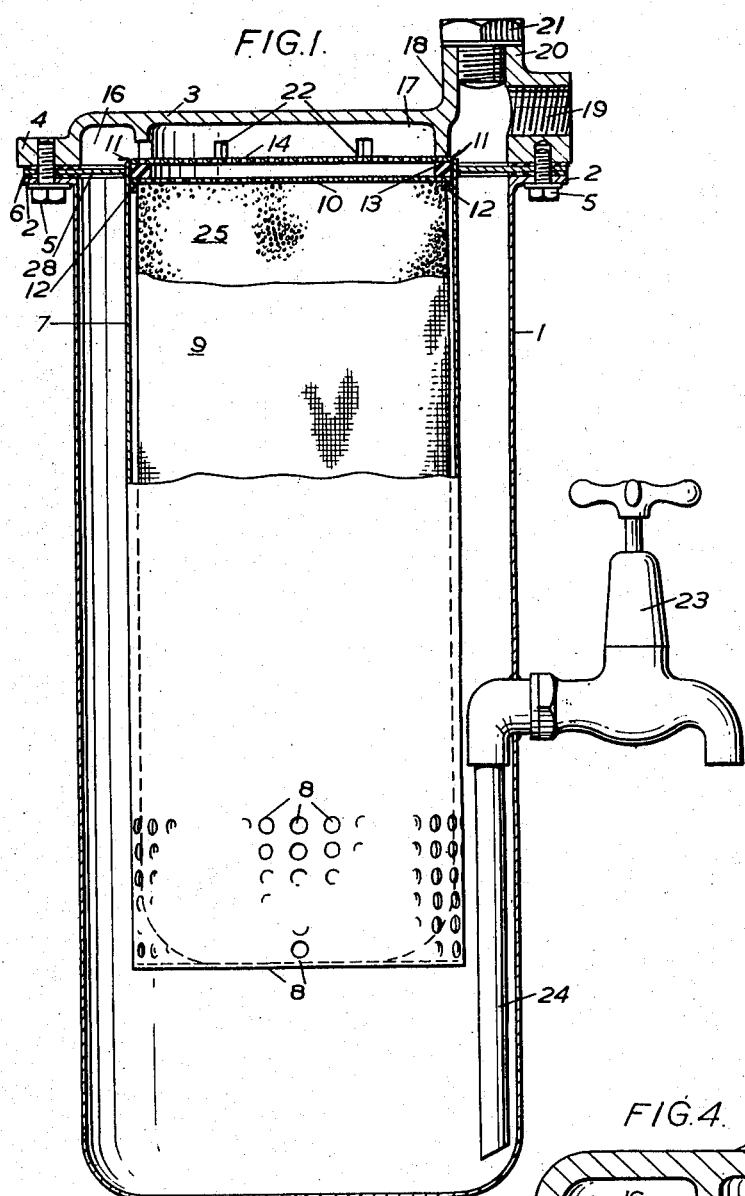
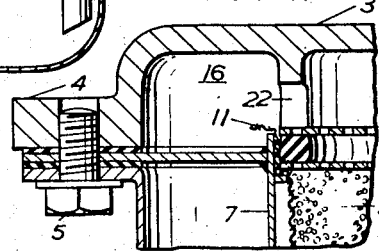
Inventors
Arthur J. Simpson
John F. Zwicky
By Ralph B. Stewart
Attorney April 7, 1953  A. J. SIMPSON ET AL  2,633,990
FILTERING DEVICE
Filed Oct. 3, 1949  2 SHEETS—SHEET 2
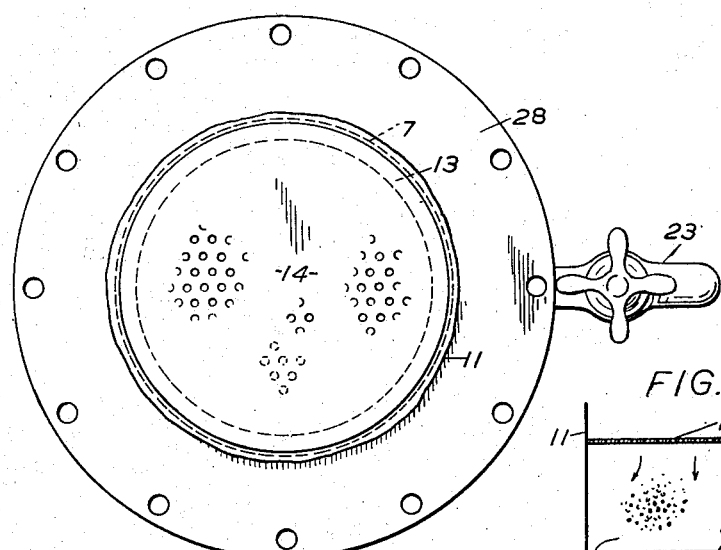
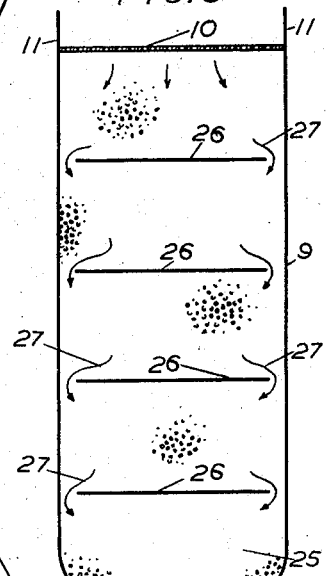
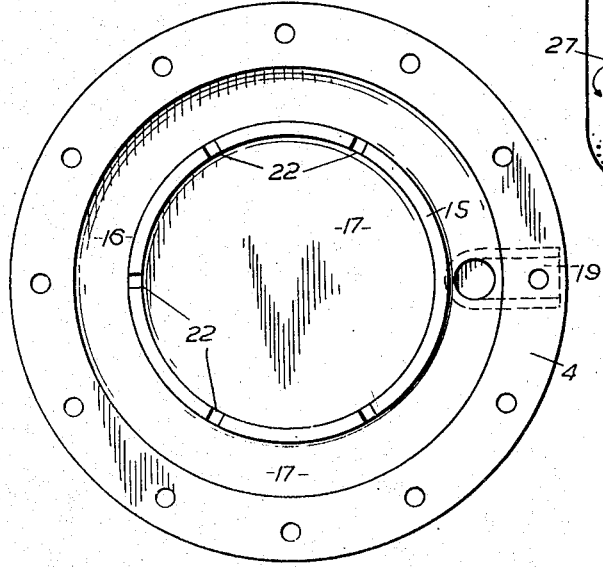
Inventors
Arthur J. Simpson
John F. Zwicky
By Ralph B. Stewart
Attorney Patented Apr. 7, 1953

2,633,990

UNITED STATES PATENT OFFICE 2,633,990

FILTERING DEVICE

Arthur James Simpson and John Frederick Zwicky, Chalfont-St. Giles, England, assignors to Steralic Filters Ltd., Beaconsfield, England, a British company Application October 3, 1949, Serial No. 119,308
In Great Britain October 4, 1948

9 Claims. (Cl. 210—131)

This invention is concerned with improvements in or relating to filtering devices for liquids and more particularly, although not necessarily exclusively to devices for filtering water.

It has previously been proposed to provide water filtering devices in which the water to be filtered is passed through a container filled with a granular filtering medium such as for instance activated carbon, and such devices are so constructed that water is fed directly into the container for the filtering medium, and thence to an outlet. It is a disadvantage of such devices that if water at main pressure is to be filtered there is a tendency for the filtering medium to become displaced thus forming channels through the container with a resultant decrease in filtering effect, and if to avoid this defect water at a pressure lower than mains pressure is led to the filter only a slow rate of flow at the outlet is achieved.

In water filters it is of primary importance that a high rate of flow together with an efficient filtering action should be obtained and further that the filter should be so constructed that in spite of the fact that water under mains pressure is being treated there should be no possibility of any unfiltered water being mixed with filtered water. It is further of importance that the constituent parts of the filter should be rapidly and easily accessible for cleaning or changing by a user.

It is an object of this invention to provide an improved filtering device for liquids which avoids the above mentioned disadvantages and achieves the above stated important characteristics in a simple and efficient manner.

According to the present invention therefore there is provided a filtering device for liquids comprising in combination a reservoir for filtered liquid, a removable container for a granular filtering medium extending thereinto, a detachable cover having an inlet for liquid to be filtered, a prefilter disposed between said inlet and said container, means being provided for distributing liquid to be filtered from said inlet over substantially the whole area of said pre-filter and a simple deformable sealing element which serves to prevent any unfiltered liquid reaching said reservoir.

The said reservoir may be provided with an internally directed flange or the line against which said container for granular filtering medium may be sealed by said sealing element, or, in a preferred construction, we may provide a cage or the like which is adapted to receive said container therein, which cage may be removably mounted in said reservoir.

Such a cage is preferably of cylindrical section and is adapted to receive the container, snugly therein, the cage and container extending into the said reservoir. The bottom of the cage, which serves to support the said container, is perforated to allow filtered liquid to enter the reservoir. Preferably the sides of the cage are also perforated at their lower end, the upper portion being preferably not perforated so as to ensure that filtered liquid passes through substantially the whole length of the container.

The said reservoir, cover and cage are all preferably flanged to enable them to be connected together e. g. by bolts, in a liquidtight manner with one, or more gaskets between adjacent surfaces.

The said container for the granular filtering medium is preferably in the form of a closed cylindrical container of a porous material such for instance as a fabric or porous plastic composition. We prefer to provide a metal or like substantially rigid perforated top to said container.

A single deformable sealing element, e. g. of rubber or the like serves to prevent any unfiltered liquid from reaching the said reservoir when the device is in operation and we prefer to provide such element in the form of a rubber ring which serves to seal said container against said inwardly directed flange or said cage, and at the same time seals the joint between said container and the above mentioned prefilter.

Thus in one form of filtering device according to the invention said container is provided with a deformable extension above the top thereof, so that the said sealing element may be inserted therein. When the prefilter is mounted on top of said sealing ring and the cover is bolted into position the deformation of the said sealing element will seal said extension against the reservoir or cage, and will further seal said prefilter in position beneath the cover and on top of the container.

The said prefilter may be in the form of a perforated disc of metal which serves to rest on said sealing element and which may be held in position between said cover and sealing element. If desired we may incorporate two or more prefilters having different sized perforations in which case said sealing element may be shaped to seal each of said prefilters or a separate sealing ring may be provided between adjacent prefilter discs.

Any desired means may be provided for ensuring that water from said inlet is distributed substantially over the whole area of the said prefilter, we have found it preferable however to mount said inlet adjacent the circumference of the cover and to provide a wall on the inner surface of said cover so as to form two concentric chambers on the inside of said cover, the outer chamber being in communication with the inlet, and the said wall having a plurality of apertures therein communicating with the inner chamber, which is located above said prefilter. By this means liquid entering said inlet will pass around the outer chamber and will enter the inner chamber through said apertures thus being distributed over the whole area of the prefilter, upon the edge of which said wall is located.

We prefer to provide outlet means for filtering devices according to the invention such that there will always be a supply of filtered liquid in the reservoir serving to seal the outlet from the atmosphere, and we, thus, arrange for an outlet pipe to extend substantially to the bottom of the reservoir, whilst the tap or cock by which filtered liquid may be drawn off is located at a level above the bottom of said pipe.

The said container is provided with a charge of granular filtering medium e. g. activated carbon, diatomaceous earth or the like. Whilst said container may be so constructed that it can be readily opened to insert a fresh charge, we prefer to have said container permanently closed so that it can be removed and cleaned complete, a fresh container being inserted if necessary.

Since there is always a tendency for liquid to create channels through a granular medium we prefer to incorporate means in the container for ensuring that the liquid being filtered is spread over substantially the whole area of the container. Thus we may provide a number of filtering media spaced throughout the depth of the granular medium which media have a slower rate of filtering than said granular medium and which thus cause the liquid to be partially deflected therearound. For example a number of sheets of filter paper of a diameter less than the diameter of the container may be dispersed amongst the granular medium.

Since it is frequently desirable to be able to sterilise water being filtered we may pretreat the said container by causing the granular medium to absorb the requisite quantity of gaseous chlorine or other sterilising agent before insertion into the device. Alternatively liquid to be sterilised may be treated before filtration by means of the addition of suitable chlorine salts such as sodium hypochlorite.

In order that the invention may be well understood a preferred embodiment by way of example only will now be described with reference to the accompanying drawings in which:

Figure 1 shows an elevation in part section thereof,

Figure 2 shows a plan view of Figure 1 with the cover removed,

Figure 3 shows an underneath plan view of the cover,

Figure 4 shows a partial sectional elevation of the seal portion to an enlarged scale; and Figure 5 shows a preferred container in sectional elevation.

A filtering device according to the invention comprises a cylindrical reservoir 1 having an annular flange 2, and a cover 3 which is flanged at 4 the two flanges 2 and 4 being drilled to receive bolts 5 by which the cover and reservoir may be tightly secured together, a gasket 6 being provided.

Inside the reservoir 1 is arranged a cage 7 which is open at its upper end and has an outwardly extending flange 28 which fits between flanges 2 and 4. The said cage 7 is closed at its lower end and has perforations 8 in its bottom wall and around its cylindrical wall at the lower end portion thereof.

The said cage 7 serves to receive a fabric container or bag 9 (Figure 5) which contains a granular filtering medium such as activated carbon. The container 9 is made of a porous fabric and is of such length that the lower end thereof rests on the perforated bottom wall of the cage 7.

The upper end of the container 9 has a perforated metal disc 10 secured thereto, and as will be seen particularly from Figure 4, the said disc 10 is arranged within an annular extension 11 at the upper end of the bag 9.

The cage 7 has a small internal annular rib 12 which extends under the edge portion of the disc 10 and thus supports the disc and the container 9, the disc 10 serving to hold a portion of the bag extension 11 in contact with the upper face of annular rib 12.

A deformable sealing element in the form of a rubber ring 13 is located within the extension 11 of container 9 and on top of the disc 10. On this ring 13 is supported a prefilter disc 14 in the form of a perforated metal disc.

The cover 3 has an internal annular wall 15 which thus provides an outer annular chamber 16 and inner chamber 17 in the said cover 3. As will be seen, the wall 15 rests on the edge portion of the prefilter disc 14. An inlet member 18 is provided on the cover 3 and communicates with the chamber 16. The inlet member 18 has two unions one 19, which serves for connection to a mains supply, and a vertical union 20 to which a static tank (not shown) can be connected, said tank conveniently being mounted on the cover 3. A plug 21 is provided to blank off one of said unions.

The wall 15 has a number of apertures 22 therethrough and spaced around the wall so that when liquid enters inlet 18 it will pass around chamber 16 and through apertures 22 into chamber 17 and thence onto the prefilter disc 14 thus ensuring that it is distributed over substantially the whole area of the filter.

The reservoir 1 is provided with an outlet cock or tap 23 whose level is above the bottom of pipe 24 which supplies tap 23. As will be seen pipe 24 extends nearly to the bottom of reservoir 1 so that there will always be a liquid seal between the atmosphere and the interior of the reservoir.

When the filtering device is to be used the cover 3 is secured to the reservoir 1 by bolts 5 which are tightened and cause the wall 15 to urge the prefilter disc 14 tightly down on to the sealing ring 13, which by its deformation seals the extension 11 of the container 9 against the cage 7 and seals the joint between the container 7 and the prefilter disc 14 which is itself tightly engaged by wall 15 of the cover 3 so that no liquid entering from inlet 18 can reach the reservoir 1 without passing through the container 9.

Liquid entering through inlet 18 will first pass through the prefilter 14 which removes any coarse particles therein. Thereafter the liquid passes through the container 9 and the granular filtering medium 25 therein. In order to avoid any tendency to channels being formed in the granular medium 25, a number of filter papers 26 of diameter less than that of container 9 are disposed in the mass of granular medium, since the rate of flow through the filter paper 26 is less than that through the granular medium 25 the liquid will tend to be directed around the papers 26 as indicated by arrows 27 in Figure 5 so that substantially the whole volume of granular medium will be utilised.

After passing through the container 9 the liquid passes to the reservoir 1 through the perforations 8 in the cage 7.

As will be seen a liquid filtering device has been provided which ensures that no unfiltered liquid can reach the reservoir of filtered liquid and which further enables substantially the whole of the filtering means to be utilised. It is a matter of great simplicity to remove the prefilter 14, the filter container 9 and the cage 7 for cleaning since it is only necessary to remove cover 3 for this purpose. A new container 9 can easily be inserted whilst cleaning and sterilisation of a used container is carried out, furthermore it will be noted that the simple sealing element 13 effects the watertight seal necessary to prevent the contact of filtered and unfiltered liquid.

It will be understood that only one preferred embodiment by way of example has been described above and that variations and modifications may be made therein without departing from the scope of the invention.

We claim:

1. In a filtering device for liquids comprising a reservoir for filtered liquid, a removable container for a granular filtering medium extending into said reservoir and being open at its upper end, a cage supported within said reservoir and adapted to receive said container through its upper end, a detachable cover having an inlet for liquid to be filtered and a prefilter element disposed between said inlet and said container and supported upon a part of said cage, the improvements which comprise means for distributing liquid over substantially the whole area of said prefilter, a deformable extension on the upper end of said container interposed between said prefilter and said cage, a deformable sealing ring disposed between the prefilter and the deformable extension of the container, said cover having an annular portion engaging said prefilter element above said sealing ring for compressing said ring and thereby to make a liquidtight seal between the said prefilter and the container and between the said deformable extension and the cage, and outlet means for said reservoir communicating with the space therein surrounding said cage.

2. A filtering device as set forth in claim 1 in which said cage has an internally extending rim which serves to support said container.

3. A filter as set forth in claim 1 in which said container is a porous fabric bag having a perforated disc closing its upper end, and said cage has an internally extending rim serving to support said container and engaging below said perforated disc.

4. A filter as set forth in claim 1 in which said means for distributing liquid over substantially the whole area of the prefilter comprises a plurality of liquid supply passages formed in said cover and connected with said inlet.

5. A filter as set forth in claim 1 in which said means for distributing liquid over substantially the whole area of the prefilter comprise an internal and an external chamber in said cover, said inlet means for liquid being in communication with said external chamber and said internal chamber being in direct communication with said prefilter, and passages spaced around said cover and providing communication between the external chamber and the internal chamber.

6. A filter as set forth in claim 1 and a pipe feeding said outlet means from said reservoir, the level of said outlet means being above the level of the intake end of said pipe so as to preserve a seal of filtered liquid between said reservoir and the atmosphere.

7. A filter as set forth in claim 1 having transverse layers of additional filtering media interposed in said granular medium and being spaced apart in said container, said layers of additional filtering media having a slower rate of filtering than said granular medium and serving to stimulate an even flow of liquid through substantially the whole of said container.

8. A filtering device for liquids comprising, in combination, a reservoir for filtered liquids, a removable container for a granular filtering medium extending into said reservoir and being open at its upper end, a cage supported within said reservoir and adapted to receive said container through its upper end and having a seating portion around its upper end portion, a detachable cover having an inlet for liquid to be filtered, a prefilter element disposed between said inlet and said container, internal and external chambers in said cover, said inlet communicating directly with said external chamber, whilst said internal chamber communicates directly with said prefilter, an intermediate wall between said two chambers and having spaced apertures formed therearound to provide communication between the inner and outer chambers so as to distribute liquid over substantially the whole surface of said prefilter, a deformable extension on the upper end of said container and extending over the seating portion of said cage, and a deformable sealing ring disposed between the prefilter and the deformable extension of the container, the said intermediate wall of said cover engaging said prefilter above said sealing ring for compressing said ring and thereby to make a liquidtight seal between the said prefilter and the container and between the said deformable extension and the cage, and outlet means for said reservoir communicating with the space therein surrounding said cage.

9. A filter as set forth in claim 7 wherein said layers comprise sheets of filter paper of smaller diameter than said container disposed amongst the said granular filtering medium.

ARTHUR JAMES SIMPSON.
JOHN FREDERICK ZWICKY.

REFERENCES CITED

The following references are of record in the file of this patent:

UNITED STATES PATENTS

| Number | Name | Date |
|---|---|---|
| 550,597 | Deck | Dec. 3, 1895 |
| 700,916 | Harris | May 27, 1902 |
| 2,320,990 | White | June 8, 1943 |
| 2,533,192 | Kennedy | Dec. 5, 1950 |

FOREIGN PATENTS

| Number | Country | Date |
|---|---|---|
| 7,088 | Great Britain | 1886 |
| 463,586 | France | Feb. 26, 1914 |